July 4, 1967 P. W. SANFORD 3,329,162
DUAL MIXING VALVE
Filed Sept. 14, 1964 3 Sheets-Sheet 1
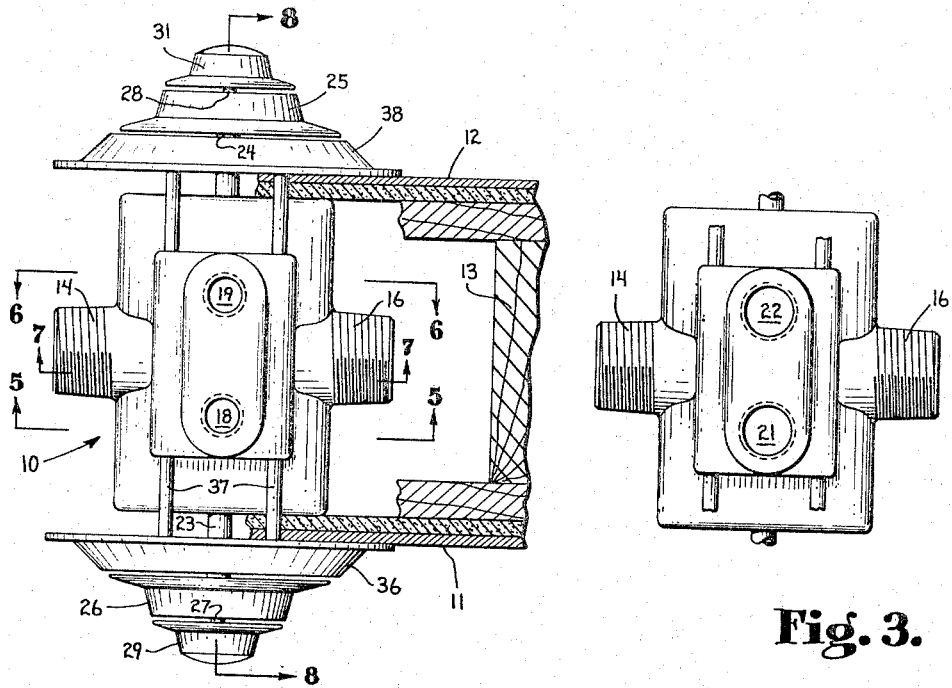
Fig. 3.
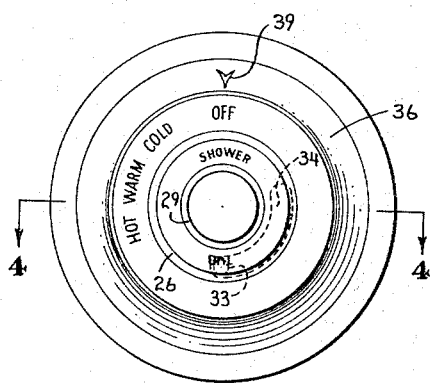
Fig. 1.
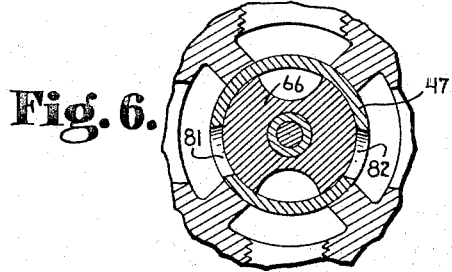
Fig. 6.
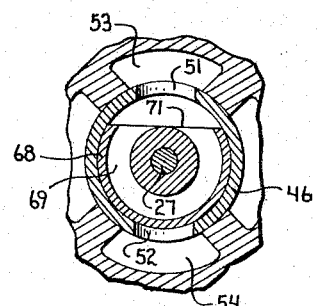
Fig. 7.
Fig. 2.
INVENTOR.
PAUL W. SANFORD
BY
Lockwood, Woodard, Smith & Weikart
Attorneys July 4, 1967 P. W. SANFORD 3,329,162
DUAL MIXING VALVE
Filed Sept. 14, 1964 3 Sheets-Sheet 2

INVENTOR.
PAUL W. SANFORD
BY
Lockwood, Woodard, Smith & Weikart
Attorneys

July 4, 1967 — P. W. SANFORD — 3,329,162
DUAL MIXING VALVE
Filed Sept. 14, 1964 — 3 Sheets-Sheet 3

INVENTOR.
PAUL W. SANFORD
BY
Lockwood, Woodard, Smith & Weikart
Attorneys

United States Patent Office 3,329,162
Patented July 4, 1967

3,329,162
DUAL MIXING VALVE
Paul W. Sanford, 5926 NE. 24th Ave.,
Portland, Oreg. 97211
Filed Sept. 14, 1964, Ser. No. 396,295
6 Claims. (Cl. 137—597)

This invention relates generally to manually operated hot and cold water mixing valves and in particular to a mixing valve having dual, back-to-back, valve components adapted to serve two separate bath installations from single hot and cold water inlets.

In modern home construction, but particularly in motel and hotel design, separate bath rooms are often arranged adjoining each other because of the decreased construction cost of such an arrangement. The shower-tub outlets in such installations are arranged back-to-back at opposite outer faces of a wall with the hot and cold water supply pipes extending within the wall. In prior art installations, the hot and cold water supply pipes had to be separately branched within the wall to supply two hot and two cold water supply pipes. Each of these was then connected to supply two separate, manually operable mixer valves, each having control elements accessible at the outer face of the wall adjacent its respective bath outlet. If identical mixer valves were used in these installations, then since the valve were back-to-back in positional relation to each other, the hot and cold water inlet branches had to be crossed over before connection to one of the mixer valves. The installation of the mixer valve was time consuming and an operation of some complexity.

It is the primary object of the present invention to provide a dual, single-housing mixing valve structure adapted for control of back-to-back bath or other facilities, by use of which single hot and cold water inlet pipes may be made to serve both bath installations.

A further object of the present invention is to provide a mixing valve of the type referred to above which, by a novel arrangement and configuration of parts, permits identical component parts to be used in each of the two valve control sub-assemblies, even though the directions of manual control movement of the two control elements are reversed with relation to each other.

A further object of the present invention is to provide a mixing valve of the type referred to above in which either of the dual valve control sub-assemblies may be cleared or repaired independently of the other and volume of flow to either of the valve sub-assemblies may be adjusted independently of the other.

These and other objects will become apparent as the description proceeds with reference to the accompanying drawings in which:

FIG. 1 is a top plan view of the valve embodying the present invention and shown installed within a wall structure, the wall structure being shown fragmentarily in section.

FIG. 2 is an end view of the valve structure.

FIG. 3 is a bottom, plan view of the valve, omitting the manual control elements.

FIG. 6 is a fragmentary sectional view taken generally along the line 6—6 of FIG. 1.

FIG. 7 is a fragmentary sectional view taken generally along the line 7—7 of FIG. 1, and illustrating the tub-shower head diverter.

Referring initially to FIGURES 1 through 4, the dual valve structure includes a body portion indicated generally at 10. The valve body is installed between the exterior wall surfaces 11 and 12, these surfaces being spaced apart by any suitable means such as two by four studding indicated fragmentarily at 12. The wall surfaces 11 and 12 may be formed by conventional lathe and plaster construction as indicated in FIG. 1. The valve body 10 is provided with a single hot water inlet, indicated at 14, and a single cold water inlet, indicated at 16, these being adapted for connection to single hot water and cold water supply pipes extending upwardly between the wall surfaces 11 and 12.

Figure 4:
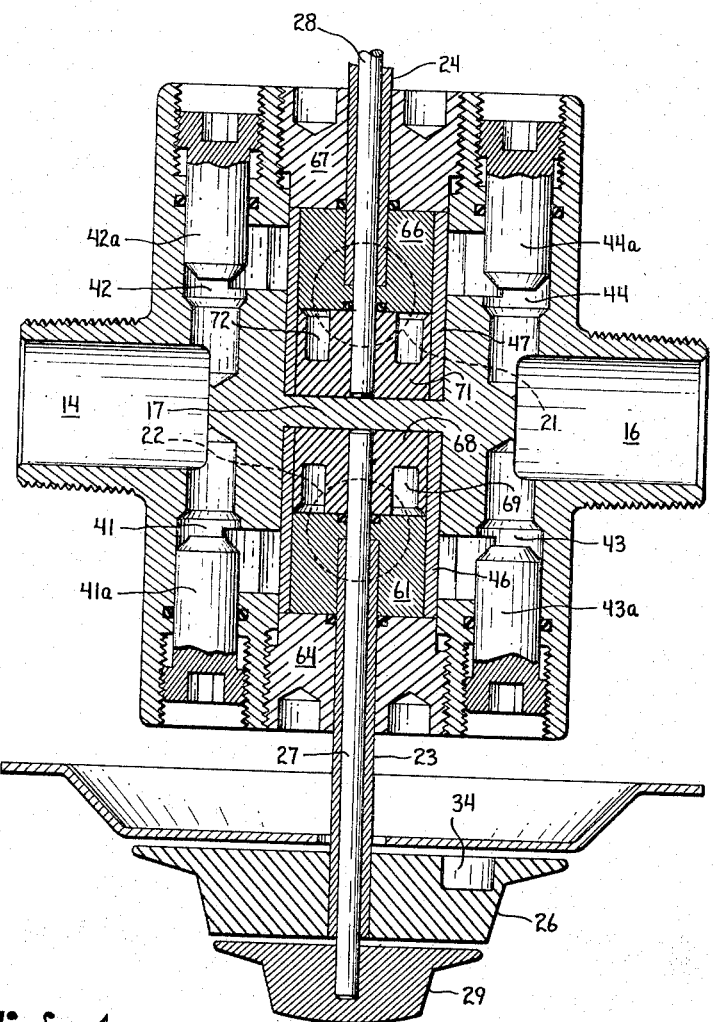
FIG. 4 is a sectional view taken generally along the line 4—4 of FIG. 2.

The body 10 is generally tubular in configuration with two axially aligned cavities which are separated by a central wall 17 (FIG. 4). As may best be seen in FIG. 1 the upper side of the body 10 is provided with two shower head outlet passages 18 and 19. The shower head outlets 18 and 19 are adapted for connection to suitable piping (not shown) which leads from the outlets to shower heads accessible at the outer faces 11 and 12, respectively, of the spaced wall surfaces between which the valve is installed.

As will be evident from FIG. 3 the underside of the valve is provided with tub outlet passages 21 and 22. These passages are adapted for connection to suitable piping leading to tub faucets accessible at the exterior wall surfaces 11 and 12, respectively.

Figure 8:
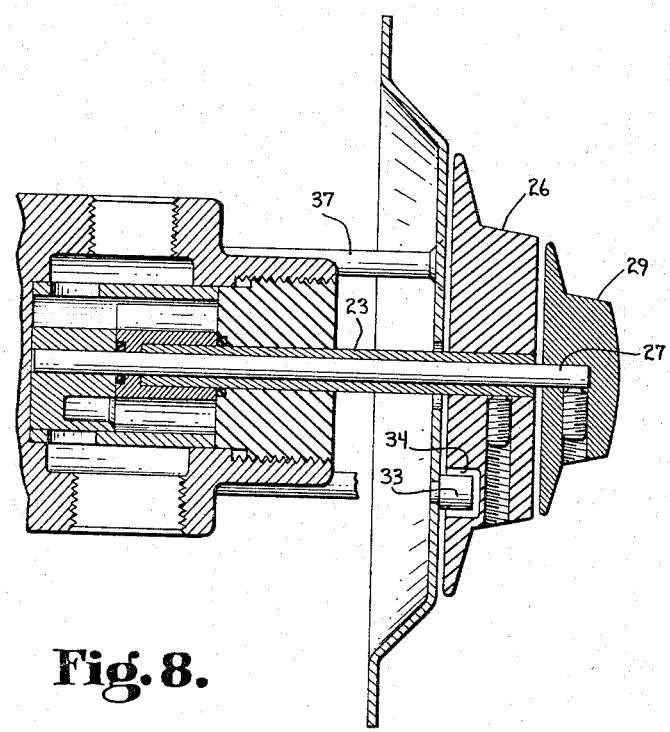
FIG. 8 is a fragmentary sectional view taken generally along the line 8—8 of FIG. 1.

Extending from opposite ends of the valve body 10 are control members taking the form of sleeves 23 and 24. As will be evident from FIG. 8 the sleeves are rigidly secured by any suitable means to a manually rotatable selector knob 26, the sleeve 24 being connected to a selector knob 25. As will be evident from FIG. 8, extending within the sleeves and rotatable independently thereof are control shafts, the shaft within the sleeve 23 being indicated at 27 in FIG. 8, the shaft within the sleeve 24 being indicated at 28 in FIG. 1. The shafts have rigidly secured thereto knobs 29 and 31. The knobs and selector members provide a means accessible at the exterior of the wall surfaces 11 and 12 by which the sleeves 23 and 24 and the shafts 27 and 28 may be rotated. As will be evident from FIG. 8, the arc through which the element 26 may be rotated is limited by engagement with an abutment 33 which extends into a groove 34 (FIG. 2) cut in the underface of the element 26. The abutment 33 extends outwardly from the outer face of a retaining plate 36 which is apertured to freely receive the sleeve 23. The plate 36 acts as a mounting plate for the valve and accommodates screws 37 which are threaded into appropriate apertures in the valve body. It will be understood that while FIG. 8 discloses the sleeve shaft and knob construction at one end of the valve, the opposite end of the valve including sleeve 24 element 27 and knob 31 are identical. The plate 36 and its counterpart 38 (FIG. 1) each carry a reference index marking indicated at 39. The inclined face of the element 26 is provided with markings indicating "off," "cold," "warm" and "hot." It will be evident from FIG. 2 that by moving the element 26 clockwise through an arc of approximately 110° the sleeve 23 will be moved to positions corresponding to the "off," "cold," etc. on the element 26. The knob 29 carries markings, diametrically opposite, reading "shower" and "tub." It will be understood that the element 27 and the knob 31 at the opposite end of the valve body carry identical markings.

Referring now primarily to FIGS. 4 through 7, the structure of the interior of the valve will be described in detail. As previously mentioned, the axially aligned central cavities in the valve body are isolated from each other by the dividing wall 17. Extending from the hot water inlet to the cavities are hot water passages 41 and 42. Similarily, extending from the cold water inlet are separate cold water passages 43 and 44, communicating between the hot and cold water inlets 14 and 16 and the two cavities. The volume of flow through the passages last mentioned may be adjusted by positioning the adjustment screws identified in FIG. 4 with the same reference number as their respective passage but with the suffix "*a*." Each of the cavities accommodates a stationary sleeve, the sleeve for one of the cavities being indicated at 46 in FIG. 4 and the sleeve for the other cavity being indicated at 47.

Figure 5:
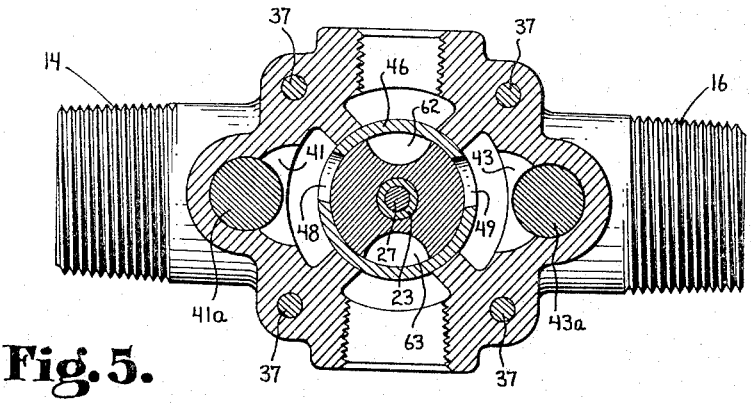
FIG. 5 is a sectional view taken generally along the line 5—5 of FIG. 1.

As will be evident from FIG. 5, the sleeve 46 has an aperture 48 therein registering with the hot water inlet passage 41. The sleeve 46 further has an aperture 49 therein registering with the cold water inlet passage 43. The hot and cold water apertures 48 and 49 in the sleeve 46 are oriented asymmetrically about the horizontal transverse axis of the sleeve. It will be understood that the sleeve 47 has identical, asymmetrically disposed apertures. The sleeve 47, however, in order to preserve the clockwise adjustment feature for the element 27 is reversed in position as compared to the position sleeve 46 in FIG. 5 as will subsequently be explained.

As will be evident from FIG. 7, the inner end portions of the sleeves 46 and 47 are provided with a shower water aperture 51 and a tub water aperture 52. The shower water aperture communicates through a passage 53 (FIG. 7) in the housing which communicates with the shower outlet 18 (FIG. 1) and the aperture 52 in the sleeve communicates with a passage 54 which, in turn, communicates with the tub outlet 22 (FIG. 3). While not shown, it will be understood that the sleeve 47 has identical, diametrically opposite apertures corresponding to the apertures 51 and 52 which communicate, respectively, with the shower outlet 19 and the tub outlet 21.

Referring again to FIG. 4, within the cavity bounded by the sleeve 46, and rigidly attached to the control sleeve 23, is a selector valve member 61. As will be evident from FIG. 5 the member 61 has longitudinal grooves 62 and 63 therein, the grooves extending the length of the member 61. As will be evident from FIG. 4, a spanner nut 64, bearing against the end of the sleeve 46, closes and seals the end of the cavity but permits extension of the sleeve 23 therethrough.

The cavity enclosed by the sleeve 47 has therein an identical member 66 rigidly secured to the control sleeve 24, the end of the cavity being sealed closed by the spanner nut 67 which is identical to the spanner nut 64 previously mentioned. The control shaft 27 extends freely through an aperture in the member 61 and its extending end has rigidly secured to it a rotatable element 68. As may be seen in FIG. 4, the element 68 has an internal, arcuate groove 69 therein which, as may best be seen in FIG. 7, terminates at a flat surface 71. It will be understood that, when appropriately positioned, the grooves 62 and 63 in the member 61 (FIG. 5) form a water passage leading to arcuate portion 69 of the element 68 and, as will be evident from FIG. 7, this arcuate portion communicates with the area between the flat surface 71 and the inner face of the sleeve 46 to provide a water passage communicating with the aperture 51 in the sleeve, this aperture, in turn, communicating with the shower outlet passage 53 and the shower outlet 21 on the housing.

The shaft 28 carries a member 71 which is identical to the member 68, the member 71 having an internal arcuate groove 72 corresponding to the groove 69, in the member 68. By comparing FIG. 2 and 7, it will be evident that with the knob 29 in its position of FIG. 2, the member 69 will be positioned, as shown in FIG. 7, with the passage formed by the groove 69 communicating with the shower outlet passage 53. If the knob 29 is rotated 180° in either direction, the flat surface 71 will be rotated so that it is opposite the aperture 52 in the sleeve 46. The internal groove 69 will then communicate with the tub water outlet 54. It will thus be evident that by rotating the knob 29 the user may selectively direct the mixture of hot and cold water either to the shower head outlet 18 or the tub faucet outlet 22. It will, of course, be evident that similar rotation of the knob 31 at the other end of housing will direct water either to the shower head outlet 19 or to the tub faucet outlet 21.

In operation, assuming that the knob 26 is in its position shown in FIG. 2, the member 61 will be in its position of FIG. 5. In this position, neither the groove 62 or 63 communicates with either of the apertures 48 or 49 in the sleeve 46. No water, either hot or cold, can thus pass to either the shower head or the faucet outlets. If the member 26 is now moved clockwise sufficiently to place the "cold" marking under the index 39, the groove 62 of FIG. 5 will be moved so that the groove 62 communicates with the aperture 49. Under these conditions, cold water will flow from the cold water inlet passage 43, through the aperture 49 and into the groove 62. Since the groove 62 communicates with the groove 69 (FIG. 7) in the member 68, water will flow, as will be evident from FIG. 7, into the shower head outlet passage 53 through the aperture 51 in the sleeve 46. It will be understood that, if the member 68 were rotated 180° so that the flat surface 71 was opposite the aperture 52, the water moving through the valve would be directed to the tub faucet outlet passage 54.

If the member 26 is now further rotated clockwise as viewed in FIG. 2, so that the marking "warm" is opposite the index 39, the groove 63 in the member 61 will be placed so that a portion of it is opposite the hot water inlet aperture 48 in the sleeve 46 and a portion of the groove 62 will remain opposite the cold water inlet aperture 49. Mixed hot and cold water will then flow through the grooves 62 and 63 to the area opposite the flat surface 71 on the member 68 (FIG. 7) and thence to the shower head outlet passage 53. If the member 26 is now rotated for the last available increment of its freedom of arcuate movement so that the marking "hot" is opposite the index 39 in FIG. 2, the groove 63 will have been moved so that it registers directly with hot water inlet aperture 48 in the sleeve 46 and the groove 62 will have been moved about two-thirds beyond direct registration with the aperture 49. Under these conditions a relatively large amount of hot water will move through the groove 63 and some cold water will move through the groove 62, both the hot and cold water passing into the groove 69 in the member 68 (FIG. 7) and from thence into the shower head outlet passage 53. It will be understood that the temperature of the water may thus be modulated by rotation of member 26.

The importance of the asymmetrical orientation of the apertures 48 and 49 in the sleeve 46 will now be emphasized with reference to FIG. 6. FIG. 6 is a view similar to FIG. 5 but showing the element 66 and the sleeve 47 rather than the element 61 and the sleeve 46 of FIG. 5. In the description of the operation set out above, it will be noted that rotation of member 26 in a clockwise direction as viewed from the wall surface 11 serves to actuate the valve from "off," through "cold" and "warm," to "hot." By a comparison of FIGS. 5 and 6 it will be evident that if the sleeve 47 were inserted in its surrounding cavity so that its cold water inlet and hot water outlet apertures, identified at 81 and 82 respectively in FIG. 6, were oriented above the transverse central axis of the sleeve 47, as is the case with the apertures 48 and 49 of FIG. 5, then a movement of the member 66 sequentially from "off" to "hot" would require a *counterclockwise* movement of the member 66 as viewed from wall surface 12. Such counterclockwise rotation of the control member 25 to move the valve through its range of setting would, of course, be unsatisfactory since the user has a conditioned tendency to move the valve *clockwise* from "off" through its range of values. This difficulty, brought about by the "back-to-back" arrangement of the valve, is remedied by inserting the sleeve 47 into its cavity 180° out of positional correspondence with sleeve 46 when the valve is assembled. When so positioned the axes of the apertures 81 and 82 will be below the transverse horizontal axes of the sleeve, as shown in FIG. 6. When the sleeve 47 is so inserted in its cavity, it will be evident that *clockwise* movement of the member 66 will carry the valve from "off" through its "hot" positions. The arrangement permits identical sleeves 46 and 47 to be used in the two portions of the valve and merely requires that one of the sleeves (47) be inserted into its cavity 180° out of positional correspondence with the other sleeve (46). It will be noted that since the apertures 51 and 52 (FIG. 7) are diametrically opposite each other, such positional reversing of the sleeve 47 with respect to the sleeve 46 will not alter the operation of the member 71 with relation to the shower head outlet 19 and the tub faucet outlet 21.

The dual valve described may, of course, be manufactured as a single valve and, in such case, the dividing wall 17 would form one exterior face of the body casting.

From the full drawing it will be evident that the structure described provides a dual mixing valve which can be installed between standard two by four studding and that one cold water supply pipe and one hot water supply pipe can supply the valve and, in turn, supply two tub faucets and two shower heads arranged back-to-back. The volume of flow from the hot and cold water inlets may be independently adjusted by means of the members 41a and 43a with regard to one valve component and by the members 42a and 44a with regard to the other valve component. Either valve component may be operated, or shut down for repair without in any way affecting the operation of the opposite valve. All of the parts of both valve and subassemblies are interchangeable.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A dual mixer valve adapted for installation between two spaced wall surfaces and adapted to provide a mixture of hot and cold water selectively to a shower head or a tub faucet adjacent one wall surface and to a shower head or tub faucet adjacent the other wall surface, said valve comprising a generally tubular valve body having a single hot water inlet and a single cold water inlet diametrically opposite the hot water inlet, first and second central cavities in said body axially aligned and isolated from each other, separate hot water and cold water inlet passages in said body communicating respectively with said hot water inlet and cold water inlet and with said central cavities, a stationary sleeve inserted within each of said cavities, each of said sleeves having separate apertures therein registering respectively with the adjacent hot water and cold water inlet passages, said hot and cold water apertures in each of said sleeves being identically oriented asymmetrically about the longitudinal axis of their respective sleeves, a selector valve means in each of said sleeves rotatable about the longitudinal axis of the sleeves to selectively obstruct or clear said hot and cold water passages, the sleeve in one cavity being inserted in its cavity 180° out of rotational correspondence with the other sleeve thereby permitting rotation of each of said valve means respectively in the same direction relative to the adjacent wall surface of the tubular valve body to sequentially obstruct, then clear the corresponding cold water sleeve aperture and finally clear the corresponding hot water sleeve aperture, manually operable means adapted to be positioned at the exterior faces of each of two adjacent wall surfaces for independently rotating the adjacent one of said valve means, tub and shower head water outlet apertures respectively diametrically oppositely disposed in each of said sleeves and adapted to be in communication with said hot and cold water passages, and means rotatable within each of said sleeves for selectively obstructing one and clearing the other of said water outlet apertures relative to said hot and cold water passages.

2. A dual mixer valve adapted for installation between two spaced wall surfaces and adapted to provide a mixture of hot and cold water selectively to a shower head or a tub faucet adjacent one wall surface and to a shower head or tub faucet adjacent the other wall surface, said valve comprising a generally tubular valve body having a single hot water inlet and a single cold water inlet, first and second central cavities in said body axially aligned and isloated from each other, separate hot water and cold water inlet passages in said body communicating respectively with said hot water inlet and with said central cavities and cold water inlet, a stationary sleeve inserted within each of said cavities, each of said sleeves having separate apertures therein registering respectively with the adjacent hot water and cold water inlet passages, said hot and cold water apertures in each of said sleeves being identically oriented asymmetrically about the longitudinal axis of their respective sleeves, a selector valve means in each of said sleeves rotatable about the longitudinal axis of the sleeves to selectively obstruct or clear said hot and cold water passages, the sleeve in one cavity being inserted in its cavity 180° out of rotational correspondence with the other sleeve thereby permitting rotation of each of said valve means respectively in the same direction relative to the adjacent wall surface of the tubular valve body to sequentially obstruct, then clear the corresponding cold water sleeve aperture and finally clear the corresponding hot water sleeve aperture, manually operable means adapted to be positioned at the exterior faces of each of two adjacent wall surfaces for independently rotating the adjacent one of said valve means, tub and shower head water outlet apertures respectively diametrically oppositely disposed in each of said sleeves and adapted to be in communication with said hot and cold water passages, and means rotatable within each of said sleeves for selectively obstructing one and clearing the other of said water outlet apertures relative to said hot and cold water passages.

3. A dual mixer valve as claimed in claim 2 in which each of the said hot and cold water inlet passages have obstructing members therein adjustably positionable from the exterior of said valve body for independently adjusting the flow capacity of each of said inlet passages.

4. A dual mixer valve adapted for installation between two spaced wall surfaces and adapted to provide a mixture of hot and cold water selectively to a shower head or a tub faucet adjacent one wall surface and to a shower head or tub faucet adjacent the other wall surface, said valve comprising a generally tubular valve body having a single hot water inlet and a single cold water inlet, first and second central cavities in said body axially aligned and isolated from each other, separate hot water and cold water inlet passages in said body communicating respectively with said hot water inlet and cold water inlet and with said central cavities, a stationary sleeve inserted within each of said cavities, each of said sleeves having separate apertures therein registering respectively with the adjacent hot water and cold water inlet passages, said hot and cold water apertures in each of said sleeves being identically oriented asymmetrically about the longitudinal axis of their respective sleeves, a selector valve means in each of said sleeves rotatable about the longitudinal axis of the sleeves to selectively obstruct or clear said hot and cold water passages, the sleeve in one cavity being inserted in its cavity 180° out of rotational correspondence with the other sleeve thereby permitting rotation of each of said valve means respectively in the same direction relative to the adjacent wall surface of the tubular valve body to sequentially obstruct, then clear the corresponding cold water sleeve aperture and finally clear the corresponding hot water sleeve aperture.

5. A dual mixer valve comprising a tubular valve body having a single hot water inlet and a single cold water inlet on diametrically opposite sides of the valve body, a divider wall extending across said housing at said water inlets and dividing the interior of said housing into first and second cavities aligned with the axis of said valve body, said valve body being formed to provide hot and cold water inlet passages extending respectively between said hot and cold water inlets and each of said cavities, outlet apertures in said housing, communicating with said cavities, valve means within each of said cavities and rotatable therein to selectively direct hot and cold water from said inlets to said outlet apertures in their respective cavities, manually adjustable means extending from each of said valve means to the exterior of said housing, said mixer valve being thereby adapted for installation between two spaced walls accommodating single hot and cold water supply lines and thus adapted to supply hot and cold water to outlets at the exterior surfaces of each of the walls with said adjustable means accessible at the exterior surfaces of the walls.

6. A mixer valve comprising a tubular valve body having a single hot water inlet and a single cold water inlet in the valve body, a divider wall extending across said housing dividing the interior of said housing into first and second cavities aligned with the axis of said valve body, said valve body being formed to provide hot and cold water inlet passages extending respectively between said hot and cold water inlets and each of said cavities, outlet apertures in said housing, communicating with said caivties, valve means within each of said cavities and rotatable therein to selectively direct hot and cold water from said inlets to said outlet apertures in their respective cavities, manually adjustable means extending from each of said valve means to the exterior of said housing, said mixer valve being thereby adapted for installation between two spaced walls accommodating single hot and cold water supply lines and thus adapted to supply hot and cold water to outlets at the exterior surfaces of each of the walls with said adjustable means accessible at the exterior surfaces of the walls.

References Cited

UNITED STATES PATENTS 1,701,692   2/1929   Mueller _____ 137—597 X

FOREIGN PATENTS 1,179,993   12/1956   France.

WILLIAM F. O'DEA, *Primary Examiner.*

D. H. LAMBERT, *Assistant Examiner.*